US009449056B1

(12) United States Patent
Deng et al.

(10) Patent No.: US 9,449,056 B1
(45) Date of Patent: Sep. 20, 2016

(54) METHOD AND SYSTEM FOR CREATING AND UPDATING AN ENTITY NAME ALIAS TABLE

(71) Applicant: Intuit Inc., Mountain View, CA (US)

(72) Inventors: Houtao Deng, Sunnyvale, CA (US); George Roumeliotis, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 467 days.

(21) Appl. No.: 13/666,760

(22) Filed: Nov. 1, 2012

(51) Int. Cl.
*G06F 7/00* (2006.01)
*G06F 17/30* (2006.01)

(52) U.S. Cl.
CPC .............................. *G06F 17/30539* (2013.01)

(58) Field of Classification Search
CPC ................... G06F 17/30734; G06F 17/30985; G06F 17/30539
USPC ................................................. 707/775, 776
See application file for complete search history.

(56) References Cited

U.S. PATENT DOCUMENTS

| 4,989,141 | A | 1/1991 | Lyons et al. |
| 5,680,305 | A | 10/1997 | Apgar, IV |
| 5,842,185 | A | 11/1998 | Chancey et al. |
| 5,873,251 | A | 2/1999 | Iino |
| 5,956,691 | A | 9/1999 | Powers |
| 6,021,415 | A | 2/2000 | Cannon et al. |
| 6,032,134 | A | 2/2000 | Weissman |
| 6,073,108 | A | 6/2000 | Peterson |
| 6,128,602 | A | 10/2000 | Northington et al. |
| 6,430,539 | B1 | 8/2002 | Lazarus et al. |
| 6,542,896 | B1 | 4/2003 | Gruenwald |
| 6,792,422 | B1 | 9/2004 | Stride et al. |
| 7,321,869 | B1 | 1/2008 | Phibbs, Jr. |
| 7,801,987 | B2 | 9/2010 | Grell et al. |
| 7,912,842 | B1 | 3/2011 | Bayliss |
| 8,175,908 | B1 | 5/2012 | Anderson |
| 8,177,121 | B2 | 5/2012 | Zimmerman et al. |
| 8,243,074 | B1 | 8/2012 | Kilat et al. |
| 8,250,008 | B1 | 8/2012 | Cao et al. |
| 8,346,661 | B2 | 1/2013 | Allison et al. |
| 8,554,592 | B1 | 10/2013 | Merz |
| 8,612,262 | B1 | 12/2013 | Condon et al. |

(Continued)

OTHER PUBLICATIONS

Bose, Ranjit, "Knowledge management-enabled health care management systems: capabilities, infrastructure, and decision-support," Expert Systems with Applications 24 (2003) 59-71, 2002, Elsevier Science Ltd.

(Continued)

*Primary Examiner* — Boris Gorney
*Assistant Examiner* — Christy Y Kim
(74) *Attorney, Agent, or Firm* — Hawley Troxell Ennis & Hawley LLP; Philip McKay

(57) ABSTRACT

A list of known names of entities is obtained along with entity name search data entered by searching parties in an attempt to identify one or more entities. The historical entity name search data entered by each individual searching party in a defined search time window is aggregated and analyzed to identify pairs of potentially related entity name searches that represent two attempts by the searching party to identify the same entity. The data representing the potentially related entity name searches is analyzed to identify a matched entity name in the list of known names that matches one of the entity names of the pair of potentially related entity name searches. Both of the entity names of the pair of potentially related entity name searches are then added to an alias list associated with the matched entity name.

16 Claims, 5 Drawing Sheets

(56) References Cited

U.S. PATENT DOCUMENTS

| | | |
|---|---|---|
| 8,732,055 B1 | 5/2014 | Dinamani et al. |
| 2002/0073114 A1 | 6/2002 | Nicastro et al. |
| 2002/0169658 A1 | 11/2002 | Adler |
| 2002/0173986 A1 | 11/2002 | Lehew et al. |
| 2002/0184043 A1 | 12/2002 | Lavorgna et al. |
| 2002/0198775 A1 | 12/2002 | Ryan |
| 2003/0065677 A1 | 4/2003 | Culp et al. |
| 2003/0167253 A1 | 9/2003 | Meinig |
| 2003/0195780 A1 | 10/2003 | Arora et al. |
| 2004/0015381 A1 | 1/2004 | Johnson et al. |
| 2004/0093281 A1 | 5/2004 | Silverstein et al. |
| 2004/0122905 A1 | 6/2004 | Smith et al. |
| 2004/0138932 A1 | 7/2004 | Johnson et al. |
| 2004/0138934 A1 | 7/2004 | Johnson et al. |
| 2004/0138935 A1 | 7/2004 | Johnson et al. |
| 2004/0138936 A1 | 7/2004 | Johnson et al. |
| 2004/0236734 A1 | 11/2004 | Yip et al. |
| 2004/0243489 A1 | 12/2004 | Mitchell et al. |
| 2005/0013428 A1 | 1/2005 | Walters, Jr. |
| 2005/0131815 A1 | 6/2005 | Fung et al. |
| 2005/0154617 A1 | 7/2005 | Ruggieri et al. |
| 2005/0154769 A1 | 7/2005 | Eckart et al. |
| 2005/0240881 A1 | 10/2005 | Rush et al. |
| 2005/0252963 A1 | 11/2005 | Adams et al. |
| 2005/0257209 A1 | 11/2005 | Adams et al. |
| 2005/0289024 A1 | 12/2005 | Hahn-Carlson et al. |
| 2006/0004746 A1 | 1/2006 | Angus et al. |
| 2006/0123461 A1 | 6/2006 | Lunt et al. |
| 2006/0178961 A1 | 8/2006 | Stanley et al. |
| 2006/0293945 A1 | 12/2006 | Feraud et al. |
| 2007/0022025 A1 | 1/2007 | Litman et al. |
| 2007/0055597 A1 | 3/2007 | Patel et al. |
| 2007/0061187 A1 | 3/2007 | Laskowski-Bender |
| 2007/0150139 A1 | 6/2007 | Hardy |
| 2007/0162445 A1 | 7/2007 | Scriffignano et al. |
| 2007/0208503 A1 | 9/2007 | Harnsberger |
| 2007/0233565 A1 | 10/2007 | Herzog et al. |
| 2007/0239799 A1* | 10/2007 | Modi ............................ 707/202 |
| 2007/0250258 A1 | 10/2007 | Hager |
| 2007/0265995 A1 | 11/2007 | Remington et al. |
| 2008/0004924 A1 | 1/2008 | Cao et al. |
| 2008/0065491 A1 | 3/2008 | Bakman |
| 2008/0147425 A1 | 6/2008 | Durvasula et al. |
| 2008/0208638 A1 | 8/2008 | Davidson et al. |
| 2008/0301162 A1 | 12/2008 | Wall et al. |
| 2009/0043637 A1 | 2/2009 | Eder |
| 2009/0048884 A1 | 2/2009 | Olives et al. |
| 2009/0144201 A1 | 6/2009 | Gierkink et al. |
| 2009/0193046 A1 | 7/2009 | Desai et al. |
| 2009/0234826 A1 | 9/2009 | Bidlack |
| 2009/0240737 A1 | 9/2009 | Hardisty et al. |
| 2009/0282010 A1* | 11/2009 | Vasudevan et al. ............... 707/4 |
| 2009/0283591 A1 | 11/2009 | Silbernagl |
| 2010/0005048 A1 | 1/2010 | Bodapati et al. |
| 2010/0057742 A1 | 3/2010 | Hardy-McGee |
| 2010/0076812 A1 | 3/2010 | Ghosh et al. |
| 2011/0087575 A1 | 4/2011 | DeBie et al. |
| 2011/0191191 A1 | 8/2011 | Bax et al. |
| 2011/0231246 A1 | 9/2011 | Bhatia et al. |
| 2011/0289109 A1* | 11/2011 | Kaoru ............................ 707/769 |
| 2012/0016738 A1 | 1/2012 | Ouimet |
| 2012/0102036 A1 | 4/2012 | Parker et al. |
| 2012/0109734 A1 | 5/2012 | Fordyce et al. |
| 2012/0173250 A1 | 7/2012 | Jeffrey et al. |
| 2012/0173397 A1 | 7/2012 | Elwell et al. |
| 2012/0189186 A1 | 7/2012 | Csulits et al. |
| 2012/0226583 A1 | 9/2012 | Uehara et al. |
| 2012/0284105 A1 | 11/2012 | Li |
| 2013/0085910 A1 | 4/2013 | Chew |
| 2013/0132410 A1 | 5/2013 | Rineer |
| 2013/0291060 A1 | 10/2013 | Moore |
| 2013/0297381 A1 | 11/2013 | Akkihal et al. |
| 2013/0339311 A1 | 12/2013 | Ferrari et al. |
| 2014/0101004 A1 | 4/2014 | Marseille et al. |

\* cited by examiner

METHOD AND SYSTEM FOR CREATING AND UPDATING AN ENTITY NAME ALIAS TABLE

SUMMARY

In accordance with one embodiment, a system and method for creating an entity name alias table includes obtaining initial identification data for one or more entities representing a list or table of known names, and/or aliases, associated with one or more entities.

In one embodiment, historical entity name search data is obtained representing entity names entered by one or more searching parties in an attempt to identify, and/or search for, one or more entities, and/or data associated with the one or more entities.

In accordance with one embodiment, a search time window is defined. In one embodiment, all the historical entity name search data entered by the searching parties during the search time window is obtained and the historical entity name search data entered by each specific individual searching party in the search time window is aggregated. In one embodiment, for each searching party, the aggregated historical entity name search data entered during the search time window is analyzed to identify pairs of potentially related entity name searches requested/made during the search time window, e.g., to identify pairs of potentially related entity name searches that represent two attempts by the same searching party to identify, and/or search for, the same entity.

In one embodiment, when a pair of potentially related entity name searches made by the same searching party in the search time window are identified, the data representing the potentially related entity name searches is analyzed and/or compared with the initial identification data to identify a matched entity name in the list of known names, and/or aliases, represented by the initial identification data that matches one of the entity names of the pair of potentially related entity name searches made by the searching party in the search time window.

In one embodiment, if a matched entity name in the list of known names, and/or aliases, represented by the initial identification data matches one of the entity names of the pair of potentially related entity name searches made by the searching party in the search time window, both of the entity names of the pair of potentially related entity name searches made by the searching party in the search time window are added to an alias list or table associated with the matched entity name.

Figure 1:
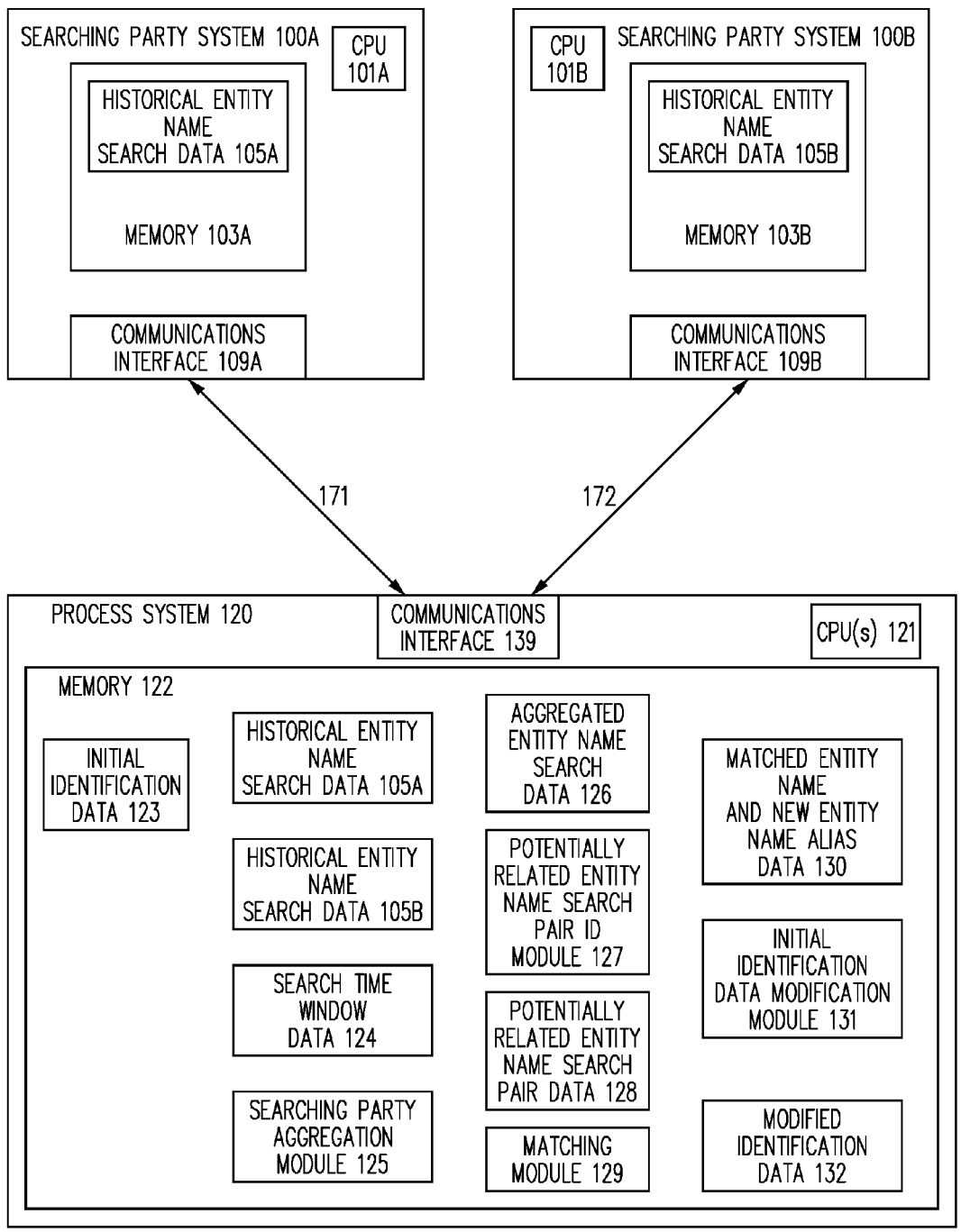
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for creating an entity name alias table includes a process for creating an entity name alias table implemented, at least in part, by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network;

a wireless and wired combination network; a satellite network; a cable network; any combination of different network types; or any other system capable of allowing communication between two or more computing systems, whether available or known at the time of filing or as later developed.

In accordance with one embodiment, the process for creating an entity name alias table is part of, implemented by, and/or otherwise associated with, one or more data management systems, such as, but not limited to, a financial management system.

Herein, a financial management system can be, but is not limited to, any data management system implemented on a computing system and/or accessed through a network that gathers financial data, including financial transactional data, from one or more sources and/or has the capability to analyze and categorize at least part of the financial data.

For instance, financial management systems include, but are not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

In one embodiment, initial identification data for one or more entities is obtained. Herein the term "entity" includes but is not limited to, any individual; party; group of individuals or parties; organization; merchant; business; institution; corporation, or other legal entity. For instance, as a specific illustrative example, in one embodiment, the term "entity" includes a financial institution such as a bank, credit card company, credit union, or any other financial institution as discussed herein, and/or as known in the art at the time of filing, and/or as recognized after the time of filing.

In one embodiment, the initial identification data for one or more entities is data representing a list, or table, or any other data organizational scheme, of known names, and/or aliases, associated with one or more entities. For example, as a specific illustrative example, in one embodiment, the initial identification data for one or more entities is a list of names and associated aliases for one or more financial institutions.

In one embodiment, the initial identification data for one or more entities is an initial implementation of an entity name alias table, including an alias list or table associated with the matched entity name, provided prior to modification by a current application of the process for creating an entity name alias table. In one embodiment, the initial identification data for one or more entities is stored in, or on, one or more memories, computing systems, networks, and/or databases using any method, means, process, or procedure, as discussed herein, and/or as known in the art at the time of filing, and/or as developed/made available after the time of filing.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

Many data processing systems provide data associated with a given entity, such as the entity's mailing address, that is stored in a memory location associated with the entity's name. In these instances, a searching party can access the data associated with a given entity by entering entity name search data that matches the entity's name as listed. However, entity names can often be associated with multiple versions of entity name search data. Consequently, currently, alias tables listing entity names, and/or logical aliases for the entity names, e.g., entity name search data deemed to be logically associated with the entity names, must be largely manually created, maintained, and updated. This currently is a resource intensive and very expensive process.

As a more specific illustrative example, some financial management systems have an associated financial institution database that includes a list of financial institutions and their associated data, such as mailing addresses, etc. In these cases, a searching party can access the financial institution data, and use it to auto-fill various data entry fields within the financial management system, by providing the correct entity name search data associated with the financial institution, e.g., by providing entity name search data that matches the entity name listed. However, many financial institution's names can be represented by slightly different entity name search data.

For instance, a searching party can enter entity name search data for bank whose name in the entity name list/table is "Cash*One" as "Cash 1", or "$1", or "$one", or "cashone" or as "cash-one", or as the technically correct "cash*one". In addition, the searching party may enter entity name data with a typo, misspelling, or transposition of letters.

As noted, to address this issue, some financial management systems include alias tables listing financial institution names and logical alias for the financial institution names, e.g., logical financial institution name search data associated with the financial institution names in initial identification data. As also noted above, these alias tables must currently be largely manually created, maintained, and updated which is a resource intensive and very expensive process. In addition, currently, even when the resources are devoted to creating an alias table, the alias table typically does not cover instances where the searching party may enter entity name search data with a typo, misspelling, or transposition of letters.

To help address the issues described above, in one embodiment, historical entity name search data is obtained. In one embodiment, the historical entity name search data represents entity names/data entered by one or more searching parties in an attempt to identify, and/or search for, one or more entities, and/or data associated with the one or more entities.

In one embodiment a search time window is defined. In various embodiments, the search time window can be, but is not limited to, a window of a few seconds, a few minutes, an hour, multiple hours, a day, or even multiple days. In one embodiment, the search time window period is chosen to attempt to limit the search time window to an interval of time during which a searching party is likely to attempt to make multiple related entity name searches that represent two or more attempts by the searching party to identify, and/or search for, the same entity.

In one embodiment, all the historical entity name search data entered by the searching parties during the search time window is obtained. In one embodiment, the historical entity name search data entered by the searching parties during the search time window is then analyzed by one or more processors associated with one or more computing systems to identify all the historical entity name search data entered by each specific individual searching party in the search time window. In one embodiment, all the historical entity name search data entered by an individual searching party in the search time window is then aggregated.

In one embodiment, for each searching party, the aggregated historical entity name search data entered during the search time window by that searching party is analyzed by one or more processors associated with one or more computing systems to identify entity name search data entered by the searching party representing pairs of potentially related entity name searches requested/made during the search time window, e.g., to identify pairs of potentially related entity name searches that represent two attempts by the searching party to identify, and/or search for, the same entity.

In one embodiment, the pairs of potentially related entity name searches requested/made by the searching party during the search time window are identified by first transforming entity name search data into "strings" of entity name search data, e.g., strings of entered character data. In one embodiment, the "raw string distance" between entity name search data strings submitted by the searching party during the search time window is then calculated.

In one embodiment, the raw string distance between two strings of entity name search data is defined as the number of different characters in the two strings of entity name search data, e.g., the number of characters in a first string of entity name search data that must be changed to make the first string of entity name search data identical to the second string of entity name search data.

As a specific illustrative example, assume a financial institution named "Cash*One" is listed in initial identification data of a financial institution database as "cash*one". Further assume that in a given search time window a searching party submitted the following three strings of entity name search data: "cash-one", "cash*one", and "bank-one". For the entity name search data strings "cash-one" and "cash*one", the dash character "-" must be replaced with an asterisk "*" to make the entity name search data string "cash-one" identical to the second entity name search data string "cash*one". Consequently, the raw string distance for the entity name search data strings "cash-one" and "cash*one" is one.

For the entity name search data strings "cash-one" and "bank-one", the characters "c", "a", "s" and "h", in the "cash-one" entity name search data string must be replaced with "b", "a", "n", and "k" to make the "cash-one" entity name search data string identical to the "bank-one" entity name search data string. Consequently, the raw string distance for the entity name search data strings "cash-one" and "bank-one" is four. Similarly, the raw string distance for the entity name search data strings "cash*one" and "bank-one" is five.

While the raw string distance, calculated as discussed above, does provide a rough indication of how close two strings of entity name search data are, e.g., how close two entered entity names are, the raw string distance can be deceptive. This is because the raw string distance indicates the number of mismatched characters in two strings of entity name search data but it does not take into account the length of the two strings of entity name search data. For example, a raw string distance of 4 is far more significant for two strings of entity name search data having 5 and 6 characters each than it is for two strings of entity name search data having 25 and 27 characters each. That is to say, 4 mismatched characters out of 6, a 66% mismatch, is a far greater mismatch that 4 mismatched characters out of 27, a 14% mismatch.

To address this potential inaccuracy, in one embodiment, a normalized string distance score is calculated for each pair of entity name search data strings. In one embodiment, the normalized string distance score is calculated using the following relationship:

The normalized string distance score for two entity name search data stings is equal to the raw string distance between the first entity name search data string and the second entity name search data string divided by the square root of the length of the first entity name search data string multiplied by the length of the second entity name search data sting.

Continuing with the specific illustrative example introduced above, recall that it was stipulated that in a first search time window a searching party submitted the following three strings of entity name search data: "cash-one", "cash*one", and "bank-one". Consequently, the length of the "cash-one" entity name search data string is 8, the length of the "cash*one" entity name search data string is 8, and the length of the "bank-one" entity name search data string is also 8.

Further recall that, the raw string distance for the entity name search data strings "cash-one" and "cash*one" is 1; the raw string distance for the entity name search data strings "cash-one" and "bank-one" is 4; and the raw string distance for the entity name search data strings "cash*one" and "bank-one" is 5. Consequently, in this specific illustrative example, the normalized string distance score for the entity name search data strings "cash-one" and "cash*one" is 1 divided by the square root of 8 times 8, or ⅛ (0.125). Likewise, the normalized string distance score for the entity name search data strings "cash-one" and "bank-one" is 4 divided by the square root of 8 times 8, or 4/8 (0.5). Similarly, the normalized string distance score for the entity name search data strings "cash*one" and "bank-one" is 5 divided by the square root of 8 times 8, or ⅝ (0.625).

In one embodiment, a threshold normalized string distance score is defined such that if the calculated normalized string distance score for a pair of entity name search data strings is greater than the threshold normalized string distance score, the pair of entity name searches represented by the pair of entity name search data strings are determined not to be a pair of potentially related entity name searches directed to the same entity, e.g., the pair of potentially related entity name searches associated with the pair of entity name search data strings are determined not to represent two attempts by the searching party to identify, and/or search for, the same entity.

On the other hand, in one embodiment, if the calculated normalized string distance score for a pair of entity name search data strings is less than, or equal to, the threshold normalized string distance score, the pair of entity name searches represented by the pair of entity name search data strings are determined to be a pair of potentially related entity name searches directed to the same entity, e.g., the pair of potentially related entity name searches associated with the pair of entity name search data strings are determined to represent two attempts by the searching party to identify, and/or search for, the same entity.

Continuing with the specific illustrative example introduced above, assume the threshold normalized string distance score is defined as 0.2. Recall that, in this specific illustrative example, the normalized string distance score for the entity name search data strings "cash-one" and "cash*one" is 0.125; the normalized string distance score for the entity name search data strings "cash-one" and "bank-one" is 0.5; and the normalized string distance score for the entity name search data strings "cash*one" and "bank-one" is 0.625. Consequently, in this specific illustrative example, only the entity name search data strings "cash-one" and "cash*one" would be determined to be a pair of potentially related entity name searches directed to the same entity, e.g., the pair of potentially related entity name searches associated with the pair of entity name search data strings "cash-one" and "cash*one" are determined to represent two attempts by the searching party to identify, and/or search for, the same entity.

In one embodiment, when a pair of potentially related entity name searches made by the same searching party in the search time window are identified, the data representing the potentially related entity name searches is analyzed and/or compared with the initial identification data to identify an entity name in the list of known names, and/or aliases, associated with one or more entities represented by the initial identification data that matches one of the entity names of the pair of potentially related entity name searches.

In one embodiment, a matched entity name in the list of known names, and/or aliases, associated with one or more entities represented by the initial identification data is identified that matches one of the entity names of the pair of potentially related entity name searches. In one embodiment, the entity names of the pair of potentially related entity name searches and the matched entity name of the initial identification data are then linked/associated with one another.

In one embodiment, both of the entity names of the pair of potentially related entity name searches made by the searching party in the search time window are then added to an alias list or table associated with the matched entity name. Consequently, the alias list or table associated with the matched entity name is updated to include both entity names of the pair of potentially related entity name searches.

In one embodiment, the data representing the updated alias list or table associated with the matched entity name is then used to modify the initial identification data for one or more entities and the modified initial identification data for one or more entities is used as an initial implementation of an entity name alias table for the next application of the process for creating an entity name alias table.

Using the system and method for creating an entity name alias table discussed herein, data processing science is used to combine searching party behavior information and string distances to create, maintain, and update an entity name alias table without the need for extensive human and financial resources. Consequently, using the system and method for creating an entity name alias table discussed herein, a searching party is more likely to be directed to the desired entity name and data.

Indeed, it has been empirically determined that one million entity name searches from three hundred thousand different searching parties that returned no matches using a financial management system that did not implement the system and method for creating an entity name alias table discussed herein were matched with at least one relevant entity name when the system and method for creating an entity name alias table was implemented.

Hardware System Architecture

FIG. 1 is a block diagram of an exemplary hardware architecture for implementing one embodiment of a process for creating an entity name alias table, such as exemplary process 300 (FIG. 3) discussed herein.

FIG. 1 includes searching party systems 100A and 100B, e.g., computing systems associated with one or more searching parties; a process system 120, e.g., a computing system associated with a provider of a process for creating an entity name alias table; and communication channels 171, and 172.

As seen in FIG. 1, searching party systems 100A and 100B include communications interfaces 109A and 109B, respectively, Central Processing Units, CPU 101A and 101B, respectively, memories 103A and 103B, respectively, and historical entity name search data 105A and 105B, respectively.

In various embodiments, searching party systems 100A and 100B can be any computing systems discussed herein, and/or as known in the art at the time of filing, and/or as developed after the time of filing.

As discussed above, many data processing systems provide data associated with a given entity, such as the entity's mailing address, that is stored in a memory location associated with the entity's name. In these instances, a searching party can access the data associated with a given entity by entering entity name search data, such as historical entity name search data 105A and 105B, which matches the entity's name as listed. However, entity names can often be associated with multiple versions of entity name search data. Consequently, currently, alias tables listing entity names, and/or logical aliases for the entity names, e.g., entity name search data deemed to be logically associated with the entity names, must be largely manually created, maintained, and updated. This currently is a resource intensive and very expensive process.

To help address the issues described above, in one embodiment, historical entity name search data 105A and 105B is obtained by process system 120 as discussed below. As discussed below, in one embodiment, historical entity name search data 105A and 105B represents entity names/data entered by one or more searching parties in an attempt to identify, and/or search for, one or more entities, and/or data associated with the one or more entities in a search time period defined by search time window data 124.

In various embodiments searching party systems 100A and 100B may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, searching party systems 100A and 100B, whether available or known at the time of filing or as later developed.

While two searching party systems, searching party systems 100A and 100B, are shown in FIG. 1, those of skill in the art will readily recognize that searching party systems 100A and 100B are actually representative of any number of searching party systems. Consequently, in various embodiments, there can be more, or less, than the two searching party systems 100A and 100B shown in FIG. 1.

As also seen in FIG. 1, process system 120 typically includes a central processing unit (CPU) 121, a memory 122, and a communications interface 139.

Process system 120 can be any computing system as discussed herein, and/or as known in the art at the time of filing, and/or as developed thereafter, that includes components that can execute all, or part, of a process for creating an entity name alias table in accordance with at least one of the embodiments as described herein.

In one embodiment, memory 122 includes all, or part, of historical entity name search data 105A and 105B as received from one or more sources, including, but not limited to, searching party systems 100A and 100B, and/or one or more financial management systems (not shown).

In one embodiment, memory 122 includes all, or part, of initial identification data 123. As discussed below, in one embodiment, initial identification data 123 includes initial identification data for one or more entities. In one embodiment, initial identification data 123 is data representing a list, or table, or any other data organizational scheme, of known names, and/or aliases, associated with one or more entities. For example, as a specific illustrative example, in one embodiment, initial identification data 123 is a list of names and associated aliases for one or more financial institutions.

In one embodiment, initial identification data 123 is an initial implementation of an entity name alias table, including an alias list or table associated with a matched entity name, provided prior to modification by a current application of the process for creating an entity name alias table.

In one embodiment, memory 122 includes all, or part, of search time window data 124 including data indicating a selected search time window period.

In various embodiments, the search time window period of search time window data 124 can be, but is not limited to, a window of a few seconds, a few minutes, an hour, multiple hours, a day, or even multiple days. In one embodiment, the search time window period of search time window data 124 is chosen to attempt to limit the search time window period to an interval of time during which a searching party is likely to attempt to make multiple related entity name searches that represent two or more attempts by the searching party to identify, and/or search for, the same entity.

In one embodiment, memory 122 includes all, or part, of searching party aggregation module 125. In one embodiment, all the historical entity name search data 105A and 105B entered by the searching parties during the search time window period of search time window data 124 is provided to searching party aggregation module 125. In one embodiment, the historical entity name search data 105A and 105B entered by the searching parties during the search time window of search time window data 124 is then analyzed by searching party aggregation module 125 using one or more processors associated with one or more computing systems, such as CPUs 121, to identify all the historical entity name search data entered by each specific individual searching party in the search time window. In one embodiment, all the historical entity name search data 105A or 105B entered by each individual searching party in the search time window of search time window data 124 is then aggregated by searching party aggregation module 125 to generate aggregated entity name search data 126.

In one embodiment, for each searching party, e.g., for each of historical entity name search data 105A or 105B, the aggregated entity name search data 126 is analyzed by potentially related entity name search pair ID module 127 using one or more processors associated with one or more computing systems, such as CPUs 121, to identify pairs of potentially related entity name searches requested/made during the search time window of search time window data 124, e.g., to identify pairs of potentially related entity name searches that represent two attempts by the searching party to identify, and/or search for, the same entity.

In one embodiment, a pair of potentially related entity name searches made by the same searching party in the search time window of search time window data 124 is identified and is represented by potentially related entity name search pair data 128.

In one embodiment, memory 122 includes all, or part, of matching module 129 that uses one or more processors associated with one or more computing systems, such as CPUs 121, to analyze potentially related entity name search pair data 128 and initial identification data 123 to identify an entity name in the list of known names, and/or aliases, associated with one or more entities represented by initial identification data 123 that matches one of the entity names of the pair of potentially related entity name searches of potentially related entity name search pair data 128.

In one embodiment, if one or more entities represented by initial identification data 123 match one of the entity names of the pair of potentially related entity name searches of potentially related entity name search pair data 128, the matched entity name and both the entity names of the pair of potentially related entity name searches of potentially related entity name search pair data 128 are used to generate matched entity name and new entity name alias data 130.

In one embodiment, matched entity name and new entity name alias data 130 is then processed by initial identification data modification module 131 to generate modified identification data 132.

Process system 120 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

In one embodiment, any, or both, of communications channels 171 and 172 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, searching party systems 100A and 100B, and/or process system 120, are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, searching party systems 100A and 100B, and/or process system 120, are not relevant.

In various embodiments, the elements shown in FIG. 1 are grouped into one or more processes, or sub-processes, used to implement all, or part of, a process for creating an entity name alias table, such as exemplary process 300 (FIG. 3) discussed herein.

Figure 2A:
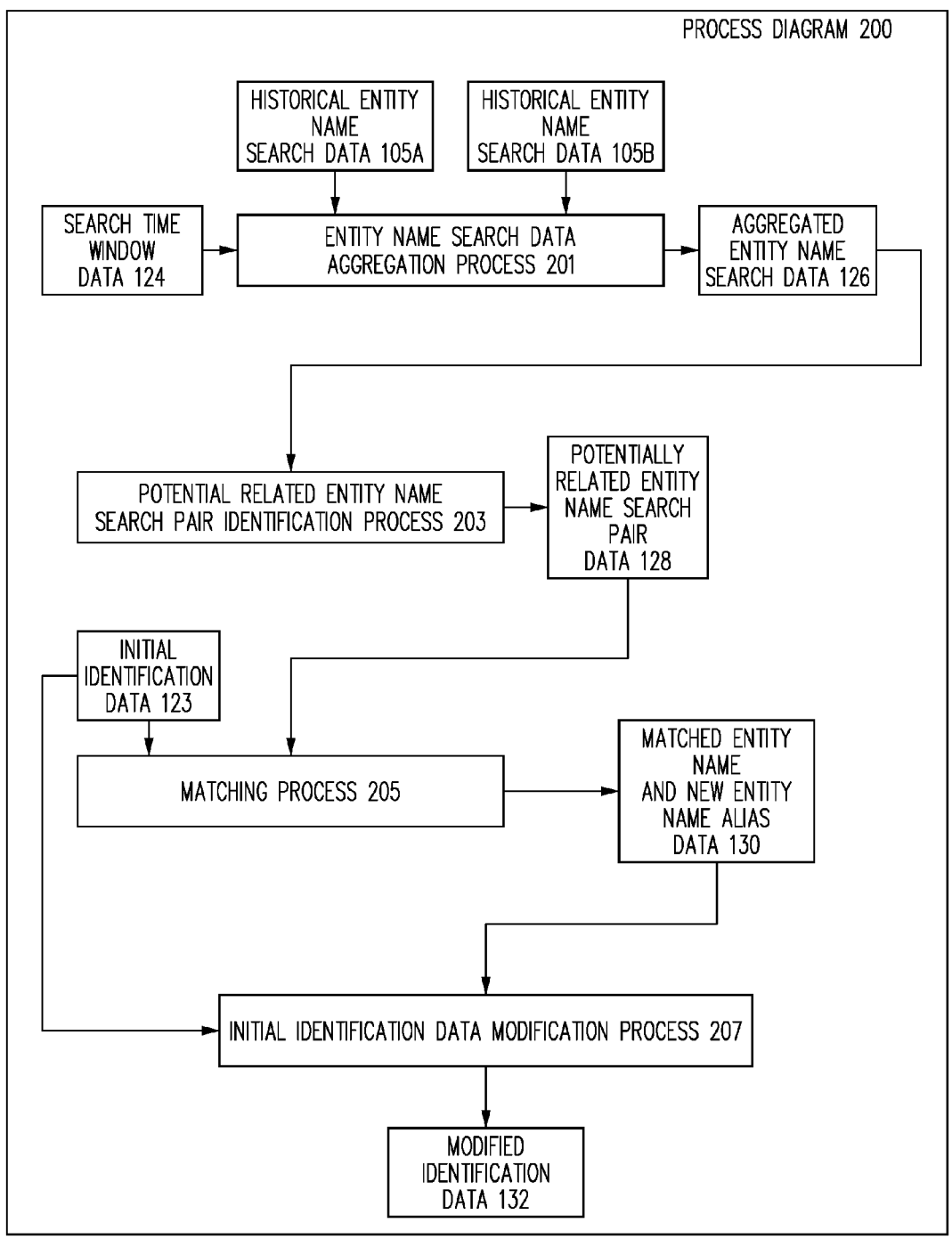
FIG. 2A is a process diagram of part of a process for creating an entity name alias table in accordance with one embodiment.

FIG. 2A is a process diagram showing one illustrative example of the interaction of various illustrative processes, or sub-processes, 201, 203, 205, and 207, used to implement part of a process for creating an entity name alias table, such as exemplary process 300 (FIG. 3) discussed herein.

FIGS. 2B, 2C, 2D and 2E show illustrative examples of processes 201, 203, 205, and 207 in accordance with one embodiment.

Figure 2B:
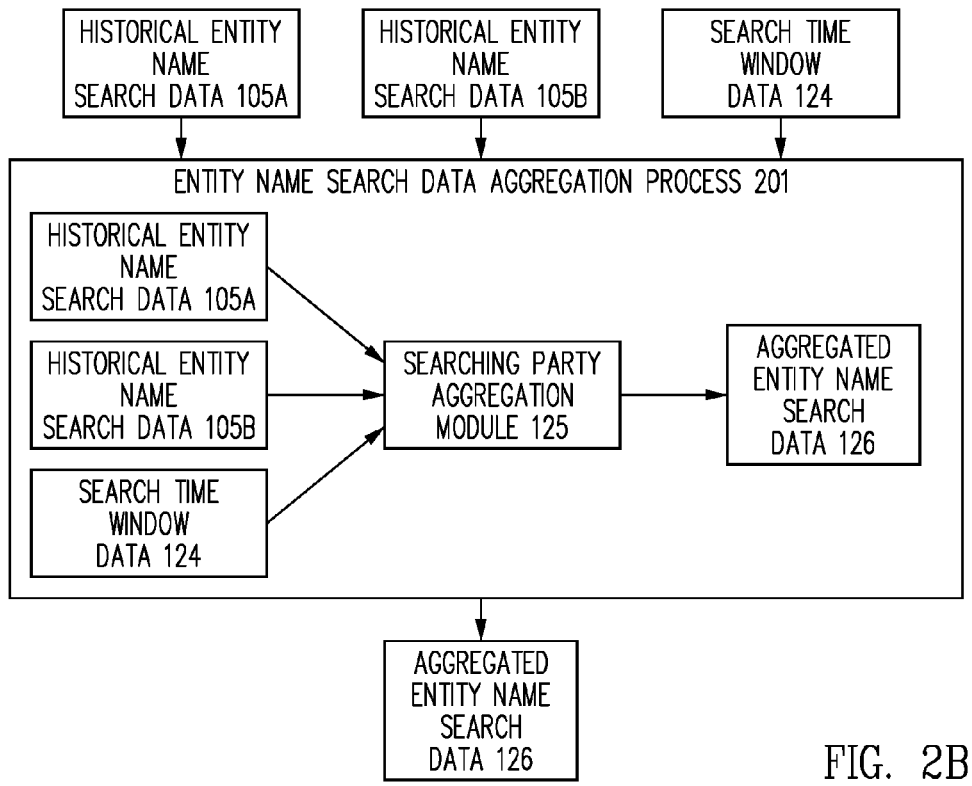
FIG. 2B shows an entity name search data aggregation process in accordance with one embodiment.

Referring to FIG. 1, FIG. 2A, FIG. 2B, FIG. 2C, FIG. 2D, and FIG. 2E together, historical entity name search data 105A and 105B and search time window data 124, are provided to entity name search data aggregation process 201 where historical entity name search data 105A and 105B are transformed into aggregated entity name search data 126. FIG. 2B shows entity name search data aggregation process 201 in more detail.

As seen in FIG. 2B, historical entity name search data 105A and 105B and search time window data 124 are used as input data for searching party aggregation module 125 which transforms historical entity name search data 105A and 105B and search time window data 124 into aggregated entity name search data 126. As discussed above, aggregated entity name search data 126 induces all the historical entity name search data 105A or 105B entered by a given searching party in the search time window of search time window data 124.

Figure 2C:
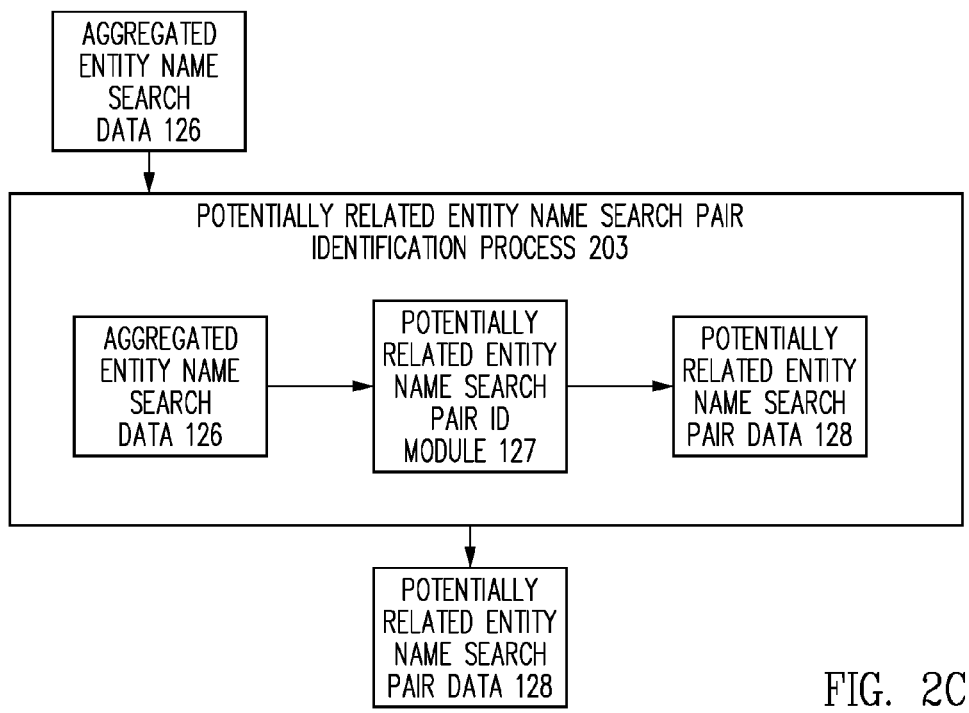
FIG. 2C shows a potentially related entity name search pair identification process in accordance with one embodiment.

Referring back to FIG. 1, FIG. 2A, FIG. 2B, FIG. 2C, FIG. 2D, and FIG. 2E together, in one embodiment, aggregated entity name search data 126 is provided to potentially related entity name search pair identification process 203 which generates potentially related entity name search pair data 128. FIG. 2C shows potentially related entity name search pair identification process 203 in more detail.

As seen in FIG. 2C, aggregated entity name search data 126 is used as input data to potentially related entity name search pair ID module 127 which transforms part of aggregated entity name search data 126 into potentially related entity name search pair data 128.

As discussed below, in one embodiment, potentially related entity name search pair ID module 127 transforms part of aggregated entity name search data 126 into potentially related entity name search pair data 128 by first transforming aggregated entity name search data 126 into "strings" of entity name search data, e.g., strings of entered character data. In one embodiment, the "raw string distance" between entity name search data strings of aggregated entity name search data 126 is then calculated.

In one embodiment, the raw string distance between two strings of entity name search data is defined as the number of different characters in the two strings of entity name search data, e.g., the number of characters in a first string of entity name search data that must be changed to make the first string of entity name search data identical to the second string of entity name search data.

As a specific illustrative example, assume a financial institution named "Cash*One" is listed in initial identification data of a financial institution database as "cash*one". Further assume that in a given search time window a searching party submitted the following three strings of entity name search data: "cash-one", "cash*one", and "bank-one". For the entity name search data strings "cash-one" and "cash*one", the dash character "-" must be replaced with an asterisk "*" to make the name search data string "cash-one" identical to the second data string "cash*one". Consequently, the raw string distance for the entity name search data strings "cash-one" and "cash*one" is one.

For the entity name search data strings "cash-one" and "bank-one", the characters "c", "a", "s" and "h", in the "cash-one" entity name search data string must be replaced with "b", "a", "n", and "k" to make the "cash-one" entity name search data string identical to the "bank-one" entity name search data string. Consequently, the raw string distance for the entity name search data strings "cash-one" and "bank-one" is four. Similarly, the raw string distance for the entity name search data strings "cash*one" and "bank-one" is five.

While the raw string distance calculated as discussed above does provide a rough indication of how close two strings of entity name search data are, e.g., how close two entered entity names are, the raw string distance can be deceptive. This is because the raw string distance indicates the number of mismatched characters in two strings of entity name search data but it does not take into account the length of the two strings of entity name search data. For example, a raw string distance of 4 is far more significant for two strings of entity name search data having 5 and 6 characters each than it is for two strings of entity name search data having 25 and 27 characters each. That is to say, 4 mismatched characters out of 6, a 66% mismatch, is a far greater mismatch that 4 mismatched characters out of 27, a 14% mismatch.

To address this potential inaccuracy, in one embodiment, a normalized string distance score is calculated for each pair of entity name search data strings by potentially related entity name search pair ID module 127. In one embodiment, the normalized string distance score is calculated using the following relationship:

The normalized string distance score for two entity name search data stings is equal to the raw string distance between the first entity name search data string and the second entity name search data string divided by the square root of the length of the first entity name search data string multiplied by the length of the second entity name search data sting.

Continuing with the specific illustrative example introduced above, recall that it was stipulated that in a first search time window a searching party submitted the following three strings of entity name search data: "cash-one", "cash*one", and "bank-one". Consequently, the length of the "cash-one" entity name search data string is 8, the length of the "cash*one" entity name search data string is 8, and the length of the "bank-one" entity name search data string is also 8.

Further recall that, the raw string distance for the entity name search data strings "cash-one" and "cash*one" is 1; the raw string distance for the entity name search data strings "cash-one" and "bank-one" is 4; and the raw string distance for the entity name search data strings "cash*one" and "bank-one" is 5. Consequently, in this specific illustrative example, the normalized string distance score for the entity name search data strings "cash-one" and "cash*one" is 1 divided by the square root of 8 times 8, or ⅛ (0.125). Likewise, the normalized string distance score for the entity name search data strings "cash-one" and "bank-one" is 4 divided by the square root of 8 times 8, or 4/8 (0.5). Similarly, the normalized string distance score for the entity name search data strings "cash*one" and "bank-one" is 5 divided by the square root of 8 times 8, or ⅝ (0.625).

In one embodiment, a threshold normalized string distance score is defined such that if the calculated normalized string distance score for a pair of entity name search data strings is greater than the threshold normalized string distance score, the pair of entity name searches represented by the pair of entity name search data strings are determined not to be a pair of potentially related entity name searches directed to the same entity, e.g., the pair of potentially related entity name searches associated with the pair of entity name search data strings are determined not to represent two attempts by the searching party to identify, and/or search for, the same entity.

On the other hand, in one embodiment, if the calculated normalized string distance score for a pair of entity name search data strings is less than, or equal to, the threshold normalized string distance score, the pair of entity name searches represented by the pair of entity name search data strings are determined to be a pair of potentially related entity name searches directed to the same entity, e.g., the pair of potentially related entity name searches associated with the pair of entity name search data strings are determined to represent two attempts by the searching party to identify, and/or search for, the same entity.

Continuing with the specific illustrative example introduced above, assume the threshold normalized string distance score is defined as 0.2. Recall that, in this specific illustrative example, the normalized string distance score for the entity name search data strings "cash-one" and "cash*one" is 0.125; the normalized string distance score for the entity name search data strings "cash-one" and "bank-one" is 0.5; and the normalized string distance score for the entity name search data strings "cash*one" and "bank-one" is 0.625. Consequently, in this specific illustrative example, only the entity name search data strings "cash-one" and "cash*one" would be determined to be a pair of potentially related entity name searches directed to the same entity, e.g., the pair of potentially related entity name searches associated with the pair of entity name search data strings "cash-one" and "cash*one" are determined to represent two attempts by the searching party to identify, and/or search for, the same entity and are then used to generate potentially related entity name search pair data 128.

Figure 2D:
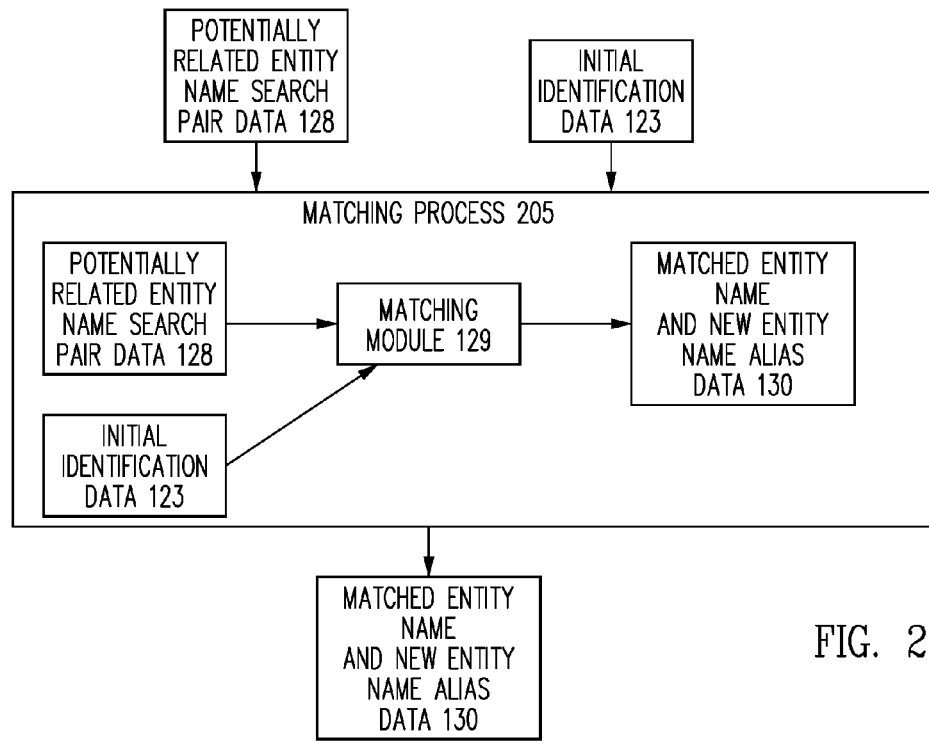
FIG. 2D shows a matching process in accordance with one embodiment.

Referring back to FIG. 1, FIG. 2A, FIG. 2B, FIG. 2C, FIG. 2D, and FIG. 2E together, in one embodiment, potentially related entity name search pair data 128 and initial identification data 123 are provided to matching process 205 which matches the entity names of potentially related entity name search pair data 128 with a matched entity name of initial identification data 123 to generate matched entity name and new entity name alias data 130. FIG. 2D shows matching process 205 in more detail.

As seen in FIG. 2D, potentially related entity name search pair data 128 and initial identification data 123 are used as input data to matching module 129. In one embodiment, matching module 129 includes a matching engine function where the two entity names of potentially related entity name search pair data 128 and the entity names in initial identification data 123 are processed to identify an entity name in the list of known names, and/or aliases, associated with one or more entities represented by initial identification data 123 that matches one of the entity names of the pair of potentially related entity name searches of potentially related entity name search pair data 128.

In one embodiment, matching module 129 then generates matched entity name and new entity name alias data 130 that includes the matched entity name and both the entity names of the pair of potentially related entity name searches of potentially related entity name search pair data 128.

Figure 2E:
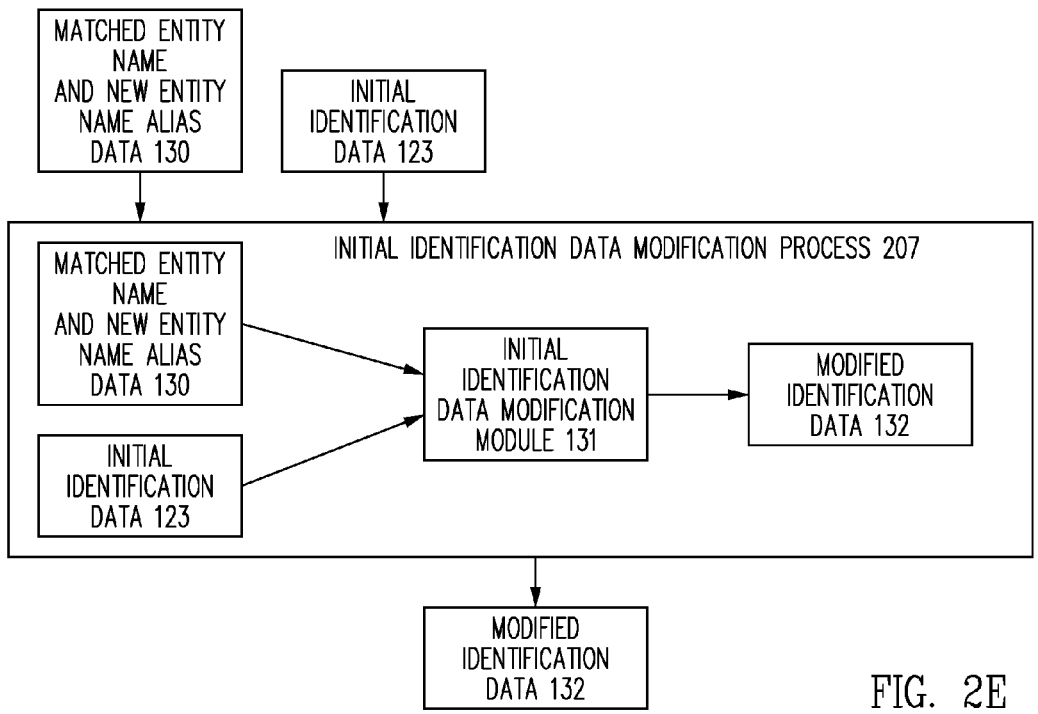
FIG. 2E shows an initial identification data modification process in accordance with one embodiment.

Referring back to FIG. 1, FIG. 2A, FIG. 2B, FIG. 2C, FIG. 2D, and FIG. 2E together, in one embodiment, matched entity name and new entity name alias data 130 and initial identification data 123 are provided to initial identification data modification process 207 which transforms at least part of initial identification data 123 into a modified identification data 132 using matched entity name and new entity name alias data 130. FIG. 2E shows initial identification data modification process 207 in more detail.

As seen in FIG. 2E, matched entity name and new entity name alias data 130 and initial identification data 123 are used as input data to initial identification data modification module 131. In one embodiment, initial identification data modification module 131 adds both of the entity names of the pair of potentially related entity name searches made by the searching party in the search time window of matched entity name and new entity name alias data 130 to an alias list or table associated with the matched entity name of matched entity name and new entity name alias data 130. Consequently, the alias list or table associated with the matched entity name of matched entity name and new entity name alias data 130 is updated to include both entity names of the pair of potentially related entity name searches to generate modified identification data 132.

In one embodiment, modified identification data 132 is then used as an initial implementation of an entity name alias table for the next application of the process for creating an entity name alias table, e.g., modified identification data 132 is used as initial identification data 123 for the next, and following, applications of the process for creating an entity name alias table.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a system and method for creating an entity name alias table includes obtaining initial identification data for one or more entities representing a list or table of known names, and/or aliases, associated with one or more entities.

In one embodiment, historical entity name search data is obtained representing entity names entered by one or more searching parties in an attempt to identify, and/or search for, one or more entities, and/or data associated with the one or more entities.

In accordance with one embodiment, a search time window is defined. In one embodiment, all the historical entity name search data entered by the searching parties during the search time window is obtained and the historical entity name search data entered by each specific individual searching party in the search time window is aggregated. In one embodiment, for each searching party, the aggregated historical entity name search data entered during the search time window is analyzed to identify pairs of potentially related entity name searches requested/made during the search time window, e.g., to identify pairs of potentially related entity name searches that represent two attempts by the same searching party to identify, and/or search for, the same entity.

In one embodiment, when a pair of potentially related entity name searches made by the same searching party in the search time window are identified, the data representing the potentially related entity name searches is analyzed and/or compared with the initial identification data to identify a matched entity name in the list of known names, and/or aliases, represented by the initial identification data that matches one of the entity names of the pair of potentially related entity name searches made by the searching party in the search time window.

In one embodiment, if a matched entity name in the list of known names, and/or aliases, represented by the initial identification data matches one of the entity names of the pair of potentially related entity name searches made by the searching party in the search time window, both of the entity names of the pair of potentially related entity name searches made by the searching party in the search time window are added to an alias list or table associated with the matched entity name.

Figure 3:
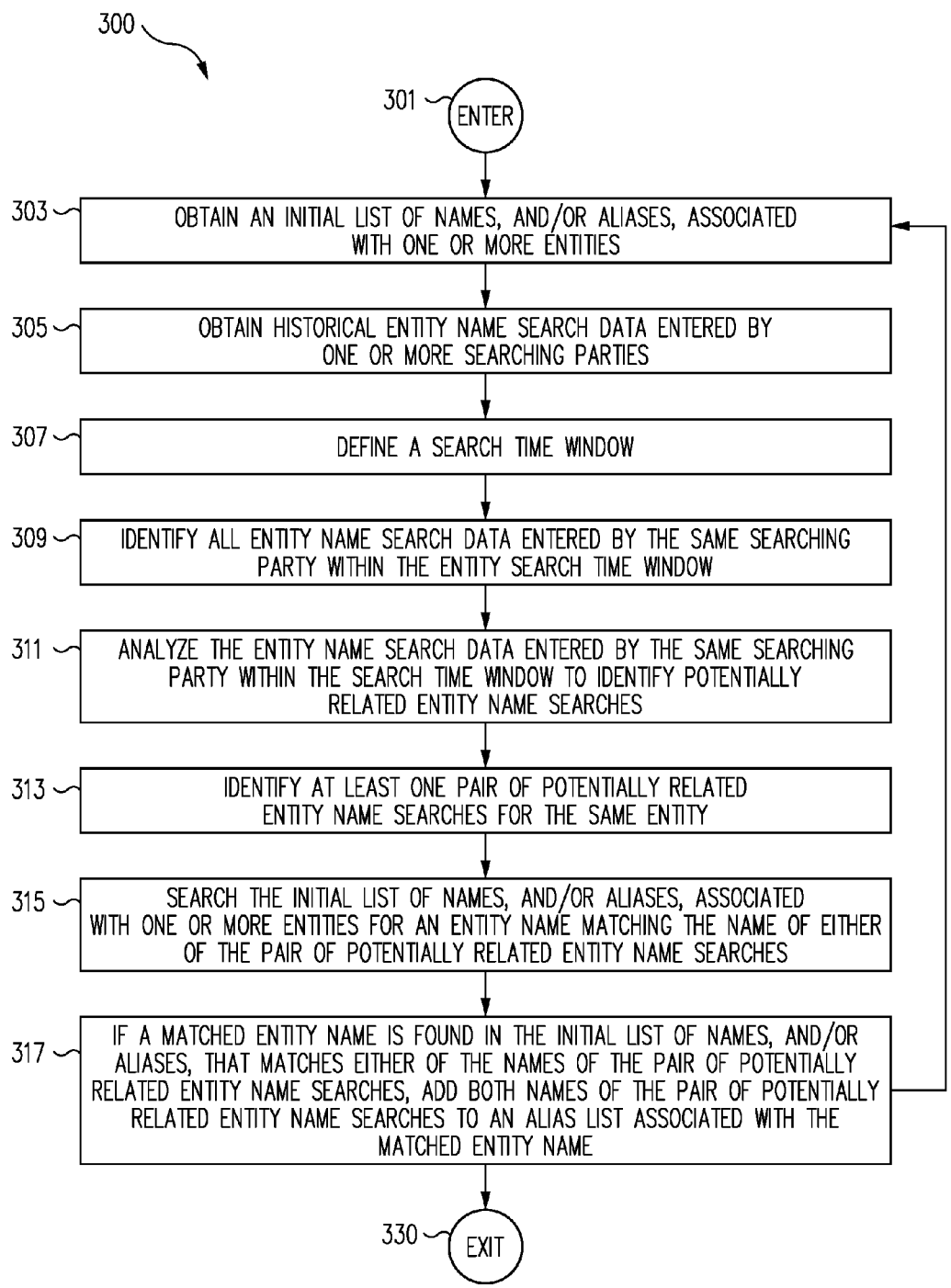
FIG. 3 is a flow chart depicting a process for creating an entity name alias table in accordance with one embodiment.

FIG. 3 is a flow chart depicting a process 300 for creating an entity name alias table in accordance with one embodiment. Process 300 for creating an entity name alias table begins at ENTER OPERATION 301 of FIG. 3 and process flow proceeds to OBTAIN AN INITIAL LIST OF NAMES, AND/OR ALIASES, ASSOCIATED WITH ONE OR MORE ENTITIES OPERATION 303.

In one embodiment, at OBTAIN AN INITIAL LIST OF NAMES, AND/OR ALIASES, ASSOCIATED WITH ONE OR MORE ENTITIES OPERATION 303, initial identification data for one or more entities is obtained.

Herein the term "entity" includes but is not limited to, any individual; party; group of individuals or parties; organization; merchant; business; institution; corporation, or other legal entity. For instance, as a specific illustrative example, in one embodiment, the term "entity" includes a financial institution such as a bank, credit card company, credit union, or any other financial institution as discussed herein, and/or as known in the art at the time of filing, and/or as recognized after the time of filing.

In one embodiment, the initial identification data for one or more entities of OBTAIN AN INITIAL LIST OF NAMES, AND/OR ALIASES, ASSOCIATED WITH ONE OR MORE ENTITIES OPERATION 303 is data representing a list, or table, or any other data organizational scheme, of known names, and/or aliases, associated with one or more entities. For example, as a specific illustrative example, in one embodiment, the initial identification data for one or more entities of OBTAIN AN INITIAL LIST OF NAMES, AND/OR ALIASES, ASSOCIATED WITH ONE OR MORE ENTITIES OPERATION 303 is a list of names and associated aliases for one or more financial institutions.

In one embodiment, the initial identification data for one or more entities of OBTAIN AN INITIAL LIST OF NAMES, AND/OR ALIASES, ASSOCIATED WITH ONE OR MORE ENTITIES OPERATION 303 is an initial implementation of an entity name alias table, including an alias list or table associated with the matched entity name, provided prior to modification by a current application of process 300 for creating an entity name alias table.

In one embodiment, the initial identification data for one or more entities of OBTAIN AN INITIAL LIST OF NAMES, AND/OR ALIASES, ASSOCIATED WITH ONE OR MORE ENTITIES OPERATION 303 is stored in, or on, one or more memories, computing systems, networks, and/or databases using any method, means, process, or procedure, as discussed herein, and/or as known in the art at the time of filing, and/or as developed/made available after the time of filing.

In one embodiment, once initial identification data for one or more entities is obtained at OBTAIN AN INITIAL LIST OF NAMES, AND/OR ALIASES, ASSOCIATED WITH ONE OR MORE ENTITIES OPERATION 303, process flow proceeds to OBTAIN HISTORICAL ENTITY NAME SEARCH DATA ENTERED BY ONE OR MORE SEARCHING PARTIES OPERATION 305.

In one embodiment, at OBTAIN HISTORICAL ENTITY NAME SEARCH DATA ENTERED BY ONE OR MORE SEARCHING PARTIES OPERATION 305 historical entity name search data is obtained.

In one embodiment, the historical entity name search data of at OBTAIN HISTORICAL ENTITY NAME SEARCH DATA ENTERED BY ONE OR MORE SEARCHING PARTIES OPERATION 305 represents entity names/data entered by one or more searching parties in an attempt to identify, and/or search for, one or more entities, and/or data associated with the one or more entities.

In one embodiment, once historical entity name search data is obtained at OBTAIN HISTORICAL ENTITY NAME SEARCH DATA ENTERED BY ONE OR MORE SEARCHING PARTIES OPERATION 305, process flow proceeds to DEFINE A SEARCH TIME WINDOW OPERATION 307.

In one embodiment, at DEFINE A SEARCH TIME WINDOW OPERATION 307, a search time window is defined.

In various embodiments, the search time window of DEFINE A SEARCH TIME WINDOW OPERATION 307 can be, but is not limited to, a window of a few seconds, a few minutes, an hour, multiple hours, a day, or even multiple days.

In one embodiment, the search time window period is chosen at DEFINE A SEARCH TIME WINDOW OPERATION 307 to attempt to limit the search time window period to an interval of time during which a searching party is likely to attempt to make multiple related entity name searches that represent two or more attempts by the searching party to identify, and/or search for, the same entity.

In one embodiment, data representing the search time window of DEFINE A SEARCH TIME WINDOW OPERATION 307 is stored in, or on, one or more memories, computing systems, networks, and/or databases using any method, means, process, or procedure, as discussed herein, and/or as known in the art at the time of filing, and/or as developed/made available after the time of filing.

In one embodiment, once a search time window is defined at DEFINE A SEARCH TIME WINDOW OPERATION 307, process flow proceeds to IDENTIFY ALL ENTITY NAME SEARCH DATA ENTERED BY THE SAME SEARCHING PARTY WITHIN THE ENTITY SEARCH TIME WINDOW OPERATION 309.

In one embodiment, at IDENTIFY ALL ENTITY NAME SEARCH DATA ENTERED BY THE SAME SEARCHING PARTY WITHIN THE ENTITY SEARCH TIME WINDOW OPERATION 309, all the historical entity name search data entered by an individual searching party in the search time window of DEFINE A SEARCH TIME WINDOW OPERATION 307 is identified and aggregated.

In one embodiment, at IDENTIFY ALL ENTITY NAME SEARCH DATA ENTERED BY THE SAME SEARCHING PARTY WITHIN THE ENTITY SEARCH TIME WINDOW OPERATION 309 all the historical entity name search data entered by the searching parties during the search time window of DEFINE A SEARCH TIME WINDOW OPERATION 307 is first obtained.

In one embodiment, at IDENTIFY ALL ENTITY NAME SEARCH DATA ENTERED BY THE SAME SEARCHING PARTY WITHIN THE ENTITY SEARCH TIME WINDOW OPERATION 309 the historical entity name search data entered by the searching parties during the search time window of DEFINE A SEARCH TIME WINDOW OPERATION 307 is analyzed to identify all the historical entity name search data entered by each specific individual searching party in the search time window.

In one embodiment, at IDENTIFY ALL ENTITY NAME SEARCH DATA ENTERED BY THE SAME SEARCHING PARTY WITHIN THE ENTITY SEARCH TIME WINDOW OPERATION 309 the historical entity name search data entered by the searching parties during the search time window is analyzed under the direction of one or more processors, such as CPU 121 of FIG. 1, associated with one or more computing systems, such as process system 120 of FIG. 1.

Returning to FIG. 3, one embodiment, at IDENTIFY ALL ENTITY NAME SEARCH DATA ENTERED BY THE SAME SEARCHING PARTY WITHIN THE ENTITY SEARCH TIME WINDOW OPERATION 309 all the historical entity name search data entered by an individual searching party in the search time window of DEFINE A SEARCH TIME WINDOW OPERATION 307 is then aggregated and stored in, or on, one or more memories, computing systems, networks, and/or databases using any method, means, process, or procedure, as discussed herein, and/or as known in the art at the time of filing, and/or as developed/made available after the time of filing.

In one embodiment, once all the historical entity name search data entered by an individual searching party in the search time window is identified and aggregated at IDENTIFY ALL ENTITY NAME SEARCH DATA ENTERED BY THE SAME SEARCHING PARTY WITHIN THE ENTITY SEARCH TIME WINDOW OPERATION 309, process flow proceeds to ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311.

In one embodiment, at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 for each searching party, the aggregated historical entity name search data of IDENTIFY ALL ENTITY NAME SEARCH DATA ENTERED BY THE SAME SEARCHING PARTY WITHIN THE ENTITY SEARCH TIME WINDOW OPERATION 309 entered during the search time window by that searching party is analyzed to identify entity name search data entered by the searching party representing pairs of potentially related entity name searches requested/made during the search time window, e.g., to identify pairs of potentially related entity name searches that represent two attempts by the searching party to identify, and/or search for, the same entity.

In one embodiment, at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 for each searching party, the aggregated historical entity name search data of IDENTIFY ALL ENTITY NAME SEARCH DATA ENTERED BY THE SAME SEARCHING PARTY WITHIN THE ENTITY SEARCH TIME WINDOW OPERATION 309 entered during the search time window by that searching party is analyzed under the direction of one or more processors, such as CPU 121 of FIG. 1, associated with one or more computing systems, such as process system 120 of FIG. 1.

Returning to FIG. 3, in one embodiment, the pairs of potentially related entity name searches requested/made by the searching party during the search time window are identified at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 by first transforming entity name search data into "strings" of entity name search data, e.g., strings of entered character data. In one embodiment, the "raw string distance" between entity name search data strings submitted by the searching party during the search time window is then calculated.

In one embodiment, the raw string distance between two strings of entity name search data is defined as the number of different characters in the two strings of entity name search data, e.g., the number of characters in a first string of entity name search data that must be changed to make the first string of entity name search data identical to the second string of entity name search data.

As a specific illustrative example, assume a financial institution named "Cash*One" is listed in initial identification data of a financial institution database as "cash*one". Further assume that in a given search time window a searching party submitted the following three strings of entity name search data: "cash-one", "cash*one", and "bank-one". For the entity name search data strings "cash-one" and "cash*one", the dash character "-" must be replaced with an asterisk "*" to make the name search data string "cash-one" identical to the second data string "cash*one". Consequently, the raw string distance for the entity name search data strings "cash-one" and "cash*one" is one.

For the entity name search data strings "cash-one" and "bank-one", the characters "c", "a", "s" and "h", in the "cash-one" entity name search data string must be replaced with "b", "a", "n", and "k" to make the "cash-one" entity name search data string identical to the "bank-one" entity name search data string. Consequently, the raw string distance for the entity name search data strings "cash-one" and "bank-one" is four. Similarly, the raw string distance for the entity name search data strings "cash*one" and "bank-one" is five.

While the raw string distance calculated as discussed above does provide a rough indication of how close two strings of entity name search data are, e.g., how close two entered entity names are, the raw string distance can be deceptive. This is because the raw string distance indicates the number of mismatched characters in two strings of entity name search data but it does not take into account the length of the two strings of entity name search data. For example, a raw string distance of 4 is far more significant for two strings of entity name search data having 5 and 6 characters each than it is for two strings of entity name search data having 25 and 27 characters each. That is to say, 4 mismatched characters out of 6, a 66% mismatch, is a far greater mismatch that 4 mismatched characters out of 27, a 14% mismatch.

To address this potential inaccuracy, in one embodiment, at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 a normalized string distance score is calculated for each pair of entity name search data strings. In one embodiment, ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 the normalized string distance score is calculated using the following relationship:

The normalized string distance score for two entity name search data stings is equal to the raw string distance between the first entity name search data string and the second entity name search data string divided by the square root of the length of the first entity name search data string multiplied by the length of the second entity name search data sting.

Continuing with the specific illustrative example introduced above, recall that it was stipulated that in a first search time window a searching party submitted the following three strings of entity name search data: "cash-one", "cash*one", and "bank-one". Consequently, the length of the "cash-one" entity name search data string is 8, the length of the "cash*one" entity name search data string is 8, and the length of the "bank-one" entity name search data string is also 8.

Further recall that, the raw string distance for the entity name search data strings "cash-one" and "cash*one" is 1; the raw string distance for the entity name search data strings "cash-one" and "bank-one" is 4; and the raw string distance for the entity name search data strings "cash*one" and "bank-one" is 5. Consequently, in this specific illustrative example, the normalized string distance score for the entity name search data strings "cash-one" and "cash*one" is 1 divided by the square root of 8 times 8, or 1/8 (0.125). Likewise, the normalized string distance score for the entity name search data strings "cash-one" and "bank-one" is 4 divided by the square root of 8 times 8, or 4/8 (0.5). Similarly, the normalized string distance score for the entity name search data strings "cash*one" and "bank-one" is 5 divided by the square root of 8 times 8, or 5/8 (0.625).

In one embodiment, at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 a threshold normalized string distance score is defined such that if the calculated normalized string distance score for a pair of entity name search data strings is greater than the threshold normalized string distance score, then at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 the pair of entity name searches represented by the pair of entity name search data strings are determined not to be a pair of potentially related entity name searches directed to the same entity, e.g., the pair of potentially related entity name searches associated with the pair of entity name search data strings are determined not to represent two attempts by the searching party to identify, and/or search for, the same entity.

On the other hand, in one embodiment, at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 if the calculated normalized string distance score for a pair of entity name search data strings is less than, or equal to, the threshold normalized string distance score, the pair of entity name searches represented by the pair of entity name search data strings are determined to be a pair of potentially related entity name searches directed to the same entity, e.g., the pair of potentially related entity name searches associated with the pair of entity name search data strings are determined to represent two attempts by the searching party to identify, and/or search for, the same entity.

Continuing with the specific illustrative example introduced above, assume the threshold normalized string distance score is defined as 0.2. Recall that, in this specific illustrative example, the normalized string distance score for the entity name search data strings "cash-one" and "cash*one" is 0.125; the normalized string distance score for the entity name search data strings "cash-one" and "bank-one" is 0.5; and the normalized string distance score for the entity name search data strings "cash*one" and "bank-one" is 0.625. Consequently, in this specific illustrative example, only the entity name search data strings "cash-one" and "cash*one" would be determined to be a pair of potentially related entity name searches directed to the same entity, e.g., the pair of potentially related entity name searches associated with the pair of entity name search data strings "cash-one" and "cash*one" are determined to represent two attempts by the searching party to identify, and/or search for, the same entity.

In one embodiment, once the aggregated historical entity name search data entered during the search time window by a given searching party is analyzed to identify pairs of potentially related entity name searches that represent two attempts by the searching party to identify, and/or search for, the same entity at ANALYZE THE ENTITY NAME SEARCH DATA ENTERED BY THE SAME SEARCHING PARTY WITHIN THE SEARCH TIME WINDOW TO IDENTIFY POTENTIALLY RELATED ENTITY NAME SEARCHES OPERATION 311 process flow proceeds to IDENTIFY AT LEAST ONE PAIR OF POTENTIALLY RELATED ENTITY NAME SEARCHES FOR THE SAME ENTITY OPERATION 313.

In one embodiment, at IDENTIFY AT LEAST ONE PAIR OF POTENTIALLY RELATED ENTITY NAME SEARCHES FOR THE SAME ENTITY OPERATION 313 a pair of potentially related entity name searches made by the same searching party in the search time window is identified.

In one embodiment, at IDENTIFY AT LEAST ONE PAIR OF POTENTIALLY RELATED ENTITY NAME SEARCHES FOR THE SAME ENTITY OPERATION 313 the entity names of the pair of potentially related entity name searches made by the same searching party in the search time window are identified and entity name search data representing the potentially related entity name searches, including data representing the entity names of the pair of potentially related entity name searches, is stored in, or on, one or more memories, computing systems, networks, and/or databases using any method, means, process, or procedure, as discussed herein, and/or as known in the art at the time of filing, and/or as developed/made available after the time of filing.

In one embodiment, once a pair of potentially related entity name searches made by the same searching party in the search time window are identified at IDENTIFY AT LEAST ONE PAIR OF POTENTIALLY RELATED ENTITY NAME SEARCHES FOR THE SAME ENTITY OPERATION 313, process flow proceeds to SEARCH THE INITIAL LIST OF NAMES, AND/OR ALIASES, ASSOCIATED WITH ONE OR MORE ENTITIES FOR AN ENTITY NAME MATCHING THE NAME OF EITHER OF THE PAIR OF POTENTIALLY RELATED ENTITY NAME SEARCHES OPERATION 315.

In one embodiment, at SEARCH THE INITIAL LIST OF NAMES, AND/OR ALIASES, ASSOCIATED WITH ONE OR MORE ENTITIES FOR AN ENTITY NAME MATCHING THE NAME OF EITHER OF THE PAIR OF POTENTIALLY RELATED ENTITY NAME SEARCHES OPERATION 315 the data representing the potentially related entity name searches of IDENTIFY AT LEAST ONE PAIR OF POTENTIALLY RELATED ENTITY NAME SEARCHES FOR THE SAME ENTITY OPERATION 313 is analyzed and/or compared with the initial identification data of OBTAIN AN INITIAL LIST OF NAMES, AND/OR ALIASES, ASSOCIATED WITH ONE OR MORE ENTITIES OPERATION 303 to identify an entity name in the list of known names, and/or aliases, associated with one or more entities represented by the initial identification data of OBTAIN AN INITIAL LIST OF NAMES, AND/OR ALIASES, ASSOCIATED WITH ONE OR MORE ENTITIES OPERATION 303 that matches one of the entity names of the pair of potentially related entity name searches of IDENTIFY AT LEAST ONE PAIR OF POTENTIALLY RELATED ENTITY NAME SEARCHES FOR THE SAME ENTITY OPERATION 313.

In one embodiment, at SEARCH THE INITIAL LIST OF NAMES, AND/OR ALIASES, ASSOCIATED WITH ONE OR MORE ENTITIES FOR AN ENTITY NAME MATCHING THE NAME OF EITHER OF THE PAIR OF POTENTIALLY RELATED ENTITY NAME SEARCHES OPERATION 315 the data representing the potentially related entity name searches of IDENTIFY AT LEAST ONE PAIR OF POTENTIALLY RELATED ENTITY NAME SEARCHES FOR THE SAME ENTITY OPERATION 313 is analyzed and/or compared with the initial identification data of OBTAIN AN INITIAL LIST OF NAMES, AND/OR ALIASES, ASSOCIATED WITH ONE OR MORE ENTITIES OPERATION 303 under the direction of one or more processors, such as CPU 121 of FIG. 1, associated with one or more computing systems, such as process system 120 of FIG. 1.

Returning to FIG. 3, in one embodiment, once the data representing the potentially related entity name searches is analyzed and/or compared with the initial identification data to identify an entity name in the list of known names, and/or aliases, associated with one or more entities represented by the initial identification data that matches one of the entity names of the pair of potentially related entity name searches at SEARCH THE INITIAL LIST OF NAMES, AND/OR ALIASES, ASSOCIATED WITH ONE OR MORE ENTITIES FOR AN ENTITY NAME MATCHING THE NAME OF EITHER OF THE PAIR OF POTENTIALLY RELATED ENTITY NAME SEARCHES OPERATION 315, process flow proceeds to IF A MATCHED ENTITY NAME IS FOUND IN THE INITIAL LIST OF NAMES, AND/OR ALIASES, THAT MATCHES EITHER OF THE NAMES OF THE PAIR OF POTENTIALLY RELATED ENTITY NAME SEARCHES, ADD BOTH NAMES OF THE PAIR OF POTENTIALLY RELATED ENTITY NAME SEARCHES TO AN ALIAS LIST ASSOCIATED WITH THE MATCHED ENTITY NAME OPERATION 317.

In one embodiment, at IF A MATCHED ENTITY NAME IS FOUND IN THE INITIAL LIST OF NAMES, AND/OR ALIASES, THAT MATCHES EITHER OF THE NAMES OF THE PAIR OF POTENTIALLY RELATED ENTITY NAME SEARCHES, ADD BOTH NAMES OF THE PAIR OF POTENTIALLY RELATED ENTITY NAME SEARCHES TO AN ALIAS LIST ASSOCIATED WITH THE MATCHED ENTITY NAME OPERATION 317 if a matched entity name in the list of known names, and/or aliases, associated with one or more entities represented by the initial identification data is identified at SEARCH THE INITIAL LIST OF NAMES, AND/OR ALIASES, ASSOCIATED WITH ONE OR MORE ENTITIES FOR AN ENTITY NAME MATCHING THE NAME OF EITHER OF THE PAIR OF POTENTIALLY RELATED ENTITY NAME SEARCHES OPERATION 315 that matches one of the entity names of the pair of potentially related entity name searches of IDENTIFY AT LEAST ONE PAIR OF POTENTIALLY RELATED ENTITY NAME SEARCHES FOR THE SAME ENTITY OPERATION 313, both of the entity names of the pair of potentially related entity name searches are added to an alias list or table associated with the matched entity name.

In one embodiment, at IF A MATCHED ENTITY NAME IS FOUND IN THE INITIAL LIST OF NAMES, AND/OR ALIASES, THAT MATCHES EITHER OF THE NAMES OF THE PAIR OF POTENTIALLY RELATED ENTITY NAME SEARCHES, ADD BOTH NAMES OF THE PAIR OF POTENTIALLY RELATED ENTITY NAME SEARCHES TO AN ALIAS LIST ASSOCIATED WITH THE MATCHED ENTITY NAME OPERATION 317 if a matched entity name in the list of known names, and/or aliases, associated with one or more entities represented by the initial identification data is identified at SEARCH THE INITIAL LIST OF NAMES, AND/OR ALIASES, ASSOCIATED WITH ONE OR MORE ENTITIES FOR AN ENTITY NAME MATCHING THE NAME OF EITHER OF THE PAIR OF POTENTIALLY RELATED ENTITY NAME SEARCHES OPERATION 315 that matches one of the entity names of the pair of potentially related entity name searches, both the entity names of the pair of potentially related entity name searches and the matched entity name of the initial identification data are linked/associated with one another.

In one embodiment, data representing both the entity names of the pair of potentially related entity name searches and the matched entity name of the initial identification data is stored in, or on, one or more memories, computing systems, networks, and/or databases using any method, means, process, or procedure, as discussed herein, and/or as known in the art at the time of filing, and/or as developed/made available after the time of filing.

In one embodiment, at IF A MATCHED ENTITY NAME IS FOUND IN THE INITIAL LIST OF NAMES, AND/OR ALIASES, THAT MATCHES EITHER OF THE NAMES OF THE PAIR OF POTENTIALLY RELATED ENTITY NAME SEARCHES, ADD BOTH NAMES OF THE PAIR OF POTENTIALLY RELATED ENTITY NAME SEARCHES TO AN ALIAS LIST ASSOCIATED WITH THE MATCHED ENTITY NAME OPERATION 317 the data representing both of the entity names of the pair of potentially related entity name searches made by the searching party in the search time window are then added to an alias list or table associated with the matched entity name.

Consequently, the alias list or table associated with the matched entity name is updated to include both entity names of the pair of potentially related entity name searches.

In one embodiment, the data representing the updated alias list or table associated with the matched entity name of IF A MATCHED ENTITY NAME IS FOUND IN THE INITIAL LIST OF NAMES, AND/OR ALIASES, THAT MATCHES EITHER OF THE NAMES OF THE PAIR OF POTENTIALLY RELATED ENTITY NAME SEARCHES, ADD BOTH NAMES OF THE PAIR OF POTENTIALLY RELATED ENTITY NAME SEARCHES TO AN ALIAS LIST ASSOCIATED WITH THE MATCHED ENTITY NAME OPERATION 317 is then used to modify the initial identification data for one or more entities of OBTAIN AN INITIAL LIST OF NAMES, AND/OR ALIASES, ASSOCIATED WITH ONE OR MORE ENTITIES OPERATION 303 and the modified initial identification data for one or more entities is used as an initial implementation of an entity name alias table for the next application of process 300 for creating an entity name alias table.

In one embodiment, once both of the entity names of the pair of potentially related entity name searches and the matched entity name of the initial identification data are added to an alias list or table associated with the matched entity name at IF A MATCHED ENTITY NAME IS FOUND IN THE INITIAL LIST OF NAMES, AND/OR ALIASES, THAT MATCHES EITHER OF THE NAMES OF THE PAIR OF POTENTIALLY RELATED ENTITY NAME SEARCHES, ADD BOTH NAMES OF THE PAIR OF POTENTIALLY RELATED ENTITY NAME SEARCHES TO AN ALIAS LIST ASSOCIATED WITH THE MATCHED ENTITY NAME OPERATION 317, process flow proceeds to EXIT OPERATION 330.

In one embodiment, at EXIT OPERATION 330, process 300 for creating an entity name alias table is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for creating an entity name alias table discussed above, data science is used to combine searching party behavior information and string distances to create, maintain, and update an entity name alias table without the need for extensive human and financial resources. Consequently, using process 300 for creating an entity name alias table, a searching party is more likely to be directed to the desired entity name and data.

Indeed, it has been empirically determined that one million entity name searches from three hundred thousand different searching parties that returned no matches using a financial management system that did not implement process 300 for creating an entity name alias table were matched with at least one relevant entity name using process 300 for creating an entity name alias table.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for creating an entity name alias table comprising the following, which when executed individually or collectively by any set of one or more processors perform a process including:
   obtaining initial identification data including data representing known entity names associated with one or more entities;
   defining a search time window;
   obtaining historical entity name search data indicating entity name searches entered by a searching party in the defined search time window;
   analyzing the historical entity name search data to identify a pair of potentially related entity name searches, each pair of potentially related entity name searches including two associated entity names, wherein analyzing the historical entity name search data to identify a pair of potentially related entity name searches includes:
   transforming at least part of the historical entity name search data into entity name search data strings representing entity names associated with entity name searches;
   determining a raw string distance between entity name search data strings;
   determining a normalized string distance between entity name search data strings, wherein the raw string distance between a first entity name search data string and a second entity name search data string is determined as the number of characters in the first entity name search data string that are different from the characters in the second entity name search data string, wherein the normalized string distance between the first and second entity name search data strings is equal to the raw string distance between the first and second entity name search data strings divided by the square root of the length of the first entity name search data string multiplied by the length of the second entity name search data string;
   defining a threshold normalized string distance;
   identifying a pair of entity name searches as potentially related entity name searches if the entity name search data strings representing the entity names of the pair of entity name searches have a normalized string distance less than the threshold normalized string distance;
   identifying a matched known entity name in the initial identification data that matches a first entity name of the two associated entity names; and
   adding the second entity name of the two associated entity names to an entity name alias table associated with the matched known entity name.

2. The computing system implemented method for creating an entity name alias table of claim 1 wherein the initial identification data includes data representing known entity names associated with the one or more entities and known entity names aliases associated with the one or more entities.

3. The computing system implemented method for creating an entity name alias table of claim 1 wherein the initial identification data is an entity name alias table.

4. The computing system implemented method for creating an entity name alias table of claim 1 wherein, once the second entity name of the two associated entity names is added to the entity name alias table associated with the matched known entity name, data representing the entity name alias table associated with the matched known entity name is added to the initial identification data.

5. A computing system implemented method for creating a financial institution name alias table comprising the following, which when executed individually or collectively by any set of one or more processors perform a process including:
   obtaining initial identification data including data representing known financial institution names associated with one or more financial institutions;
   defining a search time window;
   obtaining historical financial institution name search data indicating financial institution name searches entered by a searching party in the defined search time window;
   analyzing the historical financial institution name search data to identify a pair of potentially related financial institution name searches, each pair of potentially related financial institution name searches including two associated financial institution names, wherein analyzing the historical financial institution name search data to identify a pair of potentially related financial institution name searches includes:
   transforming at least part of the historical financial institution name search data into financial institution name search data strings representing financial institution names associated with financial institution name searches;
   determining a raw string distance between financial institution name search data strings, wherein the raw string distance between a first financial institution name search data string and a second financial institution name search data string is determined as the number of characters in the first financial institution name search data string that are different from the characters in the second financial institution name search data string;
   determining a normalized string distance between financial institution name search data strings, wherein the normalized string distance between the first and second financial institution name search data strings is equal to the raw string distance between the first and second financial institution name search data strings divided by the square root of the length of the first financial institution name search data string multiplied by the length of the second financial institution name search data string;

defining a threshold normalized string distance;

identifying a pair of financial institution name searches as potentially related financial institution name searches if the financial institution name search data strings representing the financial institution names of the pair of financial institution name searches have a normalized string distance less than the threshold normalized string distance;

identifying a matched known financial institution name in the initial identification data that matches a first financial institution name of the two associated financial institution names; and adding the second financial institution name of the two associated financial institution names to a financial institution name alias table associated with the matched known financial institution name.

6. The computing system implemented method for creating a financial institution name alias table of claim 5 wherein the initial identification data includes data representing known financial institution names associated with the one or more financial institutions and known financial institution names aliases associated with the one or more financial institutions.

7. The computing system implemented method for creating a financial institution name alias table of claim 5 wherein the initial identification data is a financial institution name alias table.

8. The computing system implemented method for creating a financial institution name alias table of claim 5 wherein, once the second financial institution name of the two associated financial institution names is added to the financial institution name alias table associated with the matched known financial institution name, data representing the financial institution name alias table associated with the matched known financial institution name is added to the initial identification data.

9. A computer program product for creating an entity name alias table comprising:

a nontransitory computer readable medium;

and computer program code, encoded on the computer readable medium, comprising computer readable instructions which, when executed via any set of one or more processors, perform the following:

obtaining initial identification data including data representing known entity names associated with one or more entities;

defining a search time window;

obtaining historical entity name search data indicating entity name searches entered by a searching party in the defined search time window;

analyzing the historical entity name search data to identify a pair of potentially related entity name searches, each pair of potentially related entity name searches including two associated entity names, wherein analyzing the historical entity name search data to identify a pair of potentially related entity name searches includes:

transforming at least part of the historical entity name search data into entity name search data strings representing entity names associated with entity name searches;

determining a raw string distance between entity name search data strings, wherein the raw string distance between a first entity name search data string and a second entity name search data string is determined as the number of characters in the first entity name search data string that are different from the characters in the second entity name search data string;

determining a normalized string distance between entity name search data strings, wherein the normalized string distance between the first and second entity name search data strings is equal to the raw string distance between the first and second entity name search data strings divided by the square root of the length of the first entity name search data string multiplied by the length of the second entity name search data string;

defining a threshold normalized string distance;

identifying a pair of entity name searches as potentially related entity name searches if the entity name search data strings representing the entity names of the pair of entity name searches have a normalized string distance less than the threshold normalized string distance;

identifying a matched known entity name in the initial identification data that matches a first entity name of the two associated entity names; and adding the second entity name of the two associated entity names to an entity name alias table associated with the matched known entity name.

10. The computer program product for creating an entity name alias table of claim 9 wherein the initial identification data includes data representing known entity names associated with the one or more entities and known entity names aliases associated with the one or more entities.

11. The computer program product for creating an entity name alias table of claim 9 wherein the initial identification data is an entity name alias table.

12. The computer program product for creating an entity name alias table of claim 9 wherein, once the second entity name of the two associated entity names is added to the entity name alias table associated with the matched known entity name, data representing the entity name alias table associated with the matched known entity name is added to the initial identification data.

13. A system for creating an entity name alias table comprising:

at least one processor; and at least one memory coupled to the at least one processor, the at least one memory having stored therein instructions which when executed by any set of the one or more processors, perform a process for creating an entity name alias table, the process for creating an entity name alias table including:

obtaining initial identification data including data representing known entity names associated with one or more entities;

defining a search time window;

obtaining historical entity name search data indicating entity name searches entered by a searching party in the defined search time window;

analyzing the historical entity name search data to identify a pair of potentially related entity name searches, each pair of potentially related entity name searches including two associated entity names, wherein analyzing the historical entity name search data to identify a pair of potentially related entity name searches includes:

transforming at least part of the historical entity name search data into entity name search data strings representing entity names associated with entity name searches;

determining a raw string distance between entity name search data strings wherein the raw string distance between a first entity name search data string and a second entity name search data string is determined as the number of characters in the first entity name search data string that are different from the characters in the second entity name search data string;

determining a normalized string distance between entity name search data strings, wherein the normalized string distance between the first and second entity name search data strings is equal to the raw string distance between the first and second entity name search data strings divided by the square root of the length of the first entity name search data string multiplied by the length of the second entity name search data string;

defining a threshold normalized string distance;

identifying a pair of entity name searches as potentially related entity name searches if the entity name search data strings representing the entity names of the pair of entity name searches have a normalized string distance less than the threshold normalized string distance;

identifying a matched known entity name in the initial identification data that matches a first entity name of the two associated entity names; and adding the second entity name of the two associated entity names to an entity name alias table associated with the matched known entity name.

14. The system for creating an entity name alias table of claim 13 wherein the initial identification data includes data representing known entity names associated with the one or more entities and known entity names aliases associated with the one or more entities.

15. The system for creating an entity name alias table of claim 13 wherein the initial identification data is an entity name alias table.

16. The system for creating an entity name alias table of claim 13 wherein, once the second entity name of the two associated entity names is added to the entity name alias table associated with the matched known entity name, data representing the entity name alias table associated with the matched known entity name is added to the initial identification data.

* * * * *